(12) United States Patent
Bacon et al.

(10) Patent No.: US 12,358,767 B2
(45) Date of Patent: Jul. 15, 2025

(54) LOW-PROFILE DRIVE MECHANISM

(71) Applicant: Herkules Equipment Corporation, Walled Lake, MI (US)

(72) Inventors: Todd John Bacon, Northville, MI (US); Eliana Virginia Podolski Bacon, Northville, MI (US)

(73) Assignee: Herkules Equipment Corporation, Walled Lake, MI (US)

( * ) Notice: Subject to any disclaimer, the term of this patent is extended or adjusted under 35 U.S.C. 154(b) by 0 days.

(21) Appl. No.: 18/204,280

(22) Filed: May 31, 2023

(65) Prior Publication Data

US 2023/0383815 A1 Nov. 30, 2023

Related U.S. Application Data

(60) Provisional application No. 63/347,311, filed on May 31, 2022, provisional application No. 63/347,333, filed on May 31, 2022.

(51) Int. Cl.
*F16H 1/22* (2006.01)
*B66F 7/06* (2006.01)
(Continued)

(52) U.S. Cl.
CPC ............... *B66F 7/065* (2013.01); *B66F 7/28* (2013.01); *F16H 1/22* (2013.01); *F16H 7/02* (2013.01); *F16H 7/06* (2013.01); *F16H 7/1263* (2013.01); *F16H 19/06* (2013.01); *H02K 7/1004* (2013.01); *H02K 7/116* (2013.01); *H02P 5/685* (2013.01); *H02P 5/695* (2013.01); *F16H 2007/0806* (2013.01); *F16H 2007/0865* (2013.01); *F16H 2007/0891* (2013.01); *F16H 2007/0895* (2013.01); *F16H 2019/0668* (2013.01)

(58) Field of Classification Search
CPC ........... F16H 1/22; H02K 7/116; B66F 7/065; B63H 23/12
USPC .......................................................... 310/112
See application file for complete search history.

(56) References Cited

U.S. PATENT DOCUMENTS 907,176 A * 12/1908 Richardson ............ H02K 16/00
1,882,069 A * 10/1932 Ekstromer .............. F04B 17/04
417/415
(Continued)

FOREIGN PATENT DOCUMENTS

GB 764005 A * 12/1956
JP 09046969 A * 2/1997

OTHER PUBLICATIONS

U.S. Appl. No. 18/204,290, filed May 31, 2023.
U.S. Appl. No. 18/204,268, filed May 31, 2023.
U.S. Appl. No. 63/347,311, filed May 31, 2022.

*Primary Examiner* — William C Joyce
(74) *Attorney, Agent, or Firm* — Howard & Howard Attorneys PLLC

(57) ABSTRACT

A drive mechanism includes a mount block extending along an axis and a plurality of electric motors supported by the mount block. The electric motors are arranged in series along the axis to define an initial electric motor, one or more intermediate electric motors, and a final electric motor. The drive mechanism also includes a gear mounted to each of the electric motors, and an output member driven by the gear mounted to the final electric motor to receive the combined rotational torque from the gears of the series of electric motors.

30 Claims, 11 Drawing Sheets

(51) Int. Cl.
*B66F 7/28* (2006.01)
*F16H 7/02* (2006.01)
*F16H 7/06* (2006.01)
*F16H 7/12* (2006.01)
*F16H 19/06* (2006.01)
*H02K 7/10* (2006.01)
*H02K 7/116* (2006.01)
*H02P 5/685* (2006.01)
*H02P 5/695* (2006.01)
*F16H 7/08* (2006.01)

(56) References Cited

U.S. PATENT DOCUMENTS

| | | | | |
|---|---|---|---|---|
| 2,463,349 | A | * | 3/1949 | Baner ............... F16H 1/22 74/421 A |
| 3,168,665 | A | * | 2/1965 | Holper ............. H02K 7/125 310/83 |
| 8,662,477 | B2 | | 3/2014 | Bacon |
| 8,708,089 | B2 | * | 4/2014 | Kitahata ........... B62D 5/0409 180/443 |
| 8,714,524 | B2 | | 5/2014 | Bacon |
| 8,733,508 | B2 | | 5/2014 | Bacon |
| 9,422,142 | B2 | | 8/2016 | Bacon et al. |
| 11,655,100 | B2 | | 5/2023 | Scarth |

\* cited by examiner

LOW-PROFILE DRIVE MECHANISM

CROSS-REFERENCE TO RELATED APPLICATIONS

The subject patent application claims priority to and all the benefits of U.S. Provisional Patent Application No. 63/347,311, which was filed on May 31, 2022, and claims priority to and all the benefits of U.S. Provisional Patent Application No. 63/347,333, which was filed on May 31, 2022, which are herein incorporated by reference in their entirety.

BACKGROUND OF THE INVENTION

1. Field of the Invention

The invention generally relates to a drive mechanism.

2. Description of the Related Art

Drive mechanisms can include an electric motor to provide rotational torque to one or more gears. The rotational torque generated by the drive mechanism is used to provide power for a variety of applications. Often, the applications require significant power which necessitate drive mechanisms capable of generating significant power. However, the applications requiring significant power often also have spatial limitations in the environment in which they operate, which necessitates the drive mechanisms to be compact. One such spatial limitation is commonly height. However, drive mechanisms typically struggle to generate significant power when spatially limited in height.

As such, there remains a need to provide an improved drive mechanism.

SUMMARY OF THE INVENTION AND ADVANTAGES

The present invention provides a drive mechanism. A drive mechanism includes a mount block extending along an axis and a plurality of electric motors supported by the mount block. The electric motors are arranged in series along the axis to define an initial electric motor, one or more intermediate electric motors, and a final electric motor. The drive mechanism also includes a gear mounted to each of the electric motors, and an output member driven by the gear mounted to the final electric motor to receive the combined rotational torque from the gears of the series of electric motors.

In another embodiment of the invention, a drive mechanism includes a mount block extending along an axis and a plurality of electric motors supported by the mount block. The electric motors are arranged in series along the axis to define an initial electric motor, one or more intermediate electric motors, and a final electric motor. The drive mechanism also includes a sprocket mounted to each of the electric motors and a chain engaged with the sprockets. The chain is configured to receive the combined rotational torque from the sprockets mounted to the electric motors. The drive mechanism also includes an output member driven by the chain to receive the combined rotational torque from the sprockets mounted to the electric motors.

In yet another embodiment of the invention, a drive mechanism includes a mount block extending along an axis and a plurality of electric motors supported by the mount block. The electric motors are arranged in series along the axis to define an initial electric motor, one or more intermediate electric motors, and a final electric motor. The drive mechanism also includes a pulley mounted to each of the electric motors and a belt engaged with the pulleys. The belt is configured to receive the combined rotational torque from the pulleys mounted to the electric motors. The drive mechanism also includes an output member driven by the belt to receive the combined rotational torque from the pulleys mounted to the electric motors.

In the preferred embodiment as shown in certain figures, the plurality of electric motors arranged in series permits the rotational torque from the gears, sprockets, or pulleys to be combined. The combined rotational torque from the gears, sprockets, or pulleys of the series of electric motors is then transferred from the gear, sprocket, or pulley of the final electric motor to drive the output member. The series arrangement of the plurality of electric motors lowers the profile of the drive mechanism while still being capable of generating significant power due to the rotational torque from the gears, sprockets, or pulleys being combined.

There has thus been outlined, rather broadly, certain features of embodiments of the invention in order that the detailed descriptions thereof may be better understood, and in order that the present contribution to the art may be better appreciated. Additional or alternative features of embodiments of the invention are described in further detail below.

In this respect, before explaining embodiments of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

To accomplish the above and related objects, the invention may be embodied in the forms illustrated in the accompanying drawings, attention being called to the fact, however, that the drawings are illustrative only, and that changes may be made in the specific constructions illustrated. Moreover, it is to be noted that the accompanying drawings are not necessarily drawn to scale or to the same scale. In particular, the scale of some of the elements of the drawings may be exaggerated to emphasize characteristics of the elements.

BRIEF DESCRIPTION OF THE DRAWINGS

Other advantages of the present invention will be readily appreciated, as the same becomes better understood by reference to the following detailed description when considered in connection with the accompanying drawings.

Figure 1:
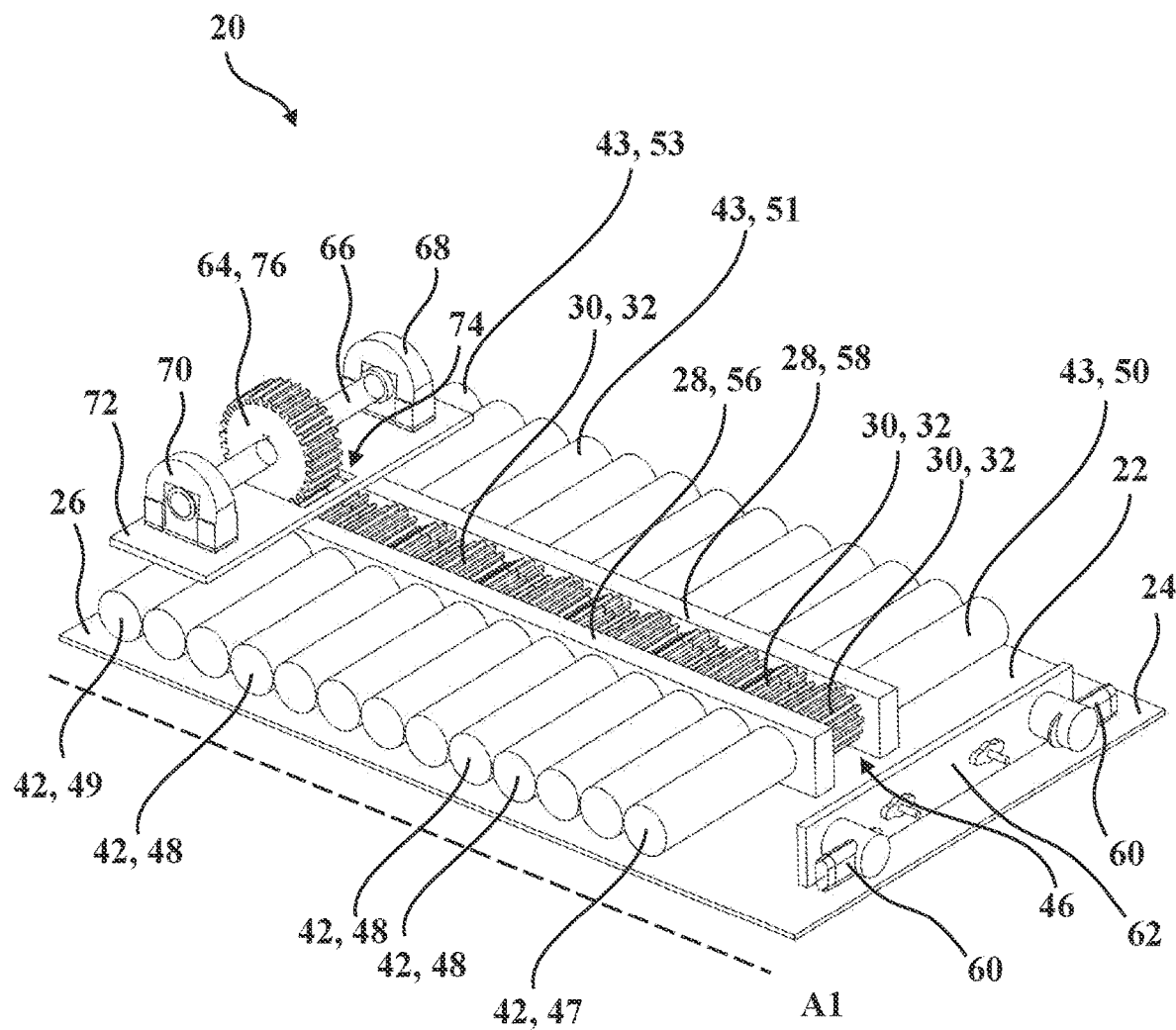
FIG. 1 is a perspective view of a drive mechanism in accordance with the invention.
Figure 2C:
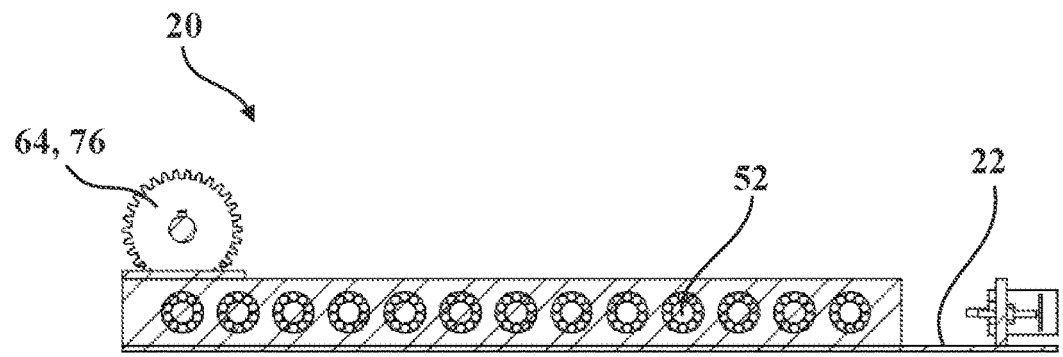
FIG. 2C is a partial cross-sectional side view of the drive mechanism according to cross-section B-B of FIG. 2A.
Figure 2B:
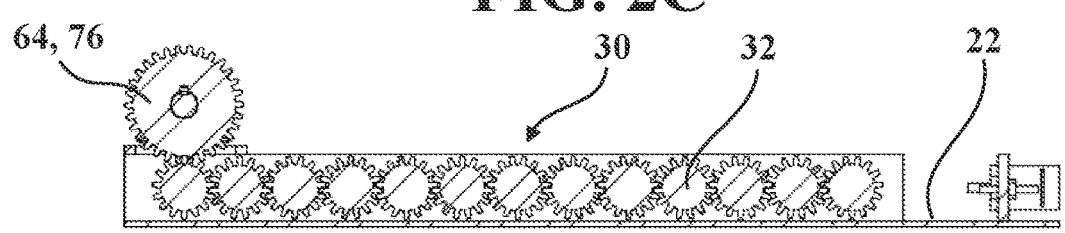
FIG. 2B is a partial cross-sectional side view of the drive mechanism according to cross-section A-A of FIG. 2A
Figure 2A:
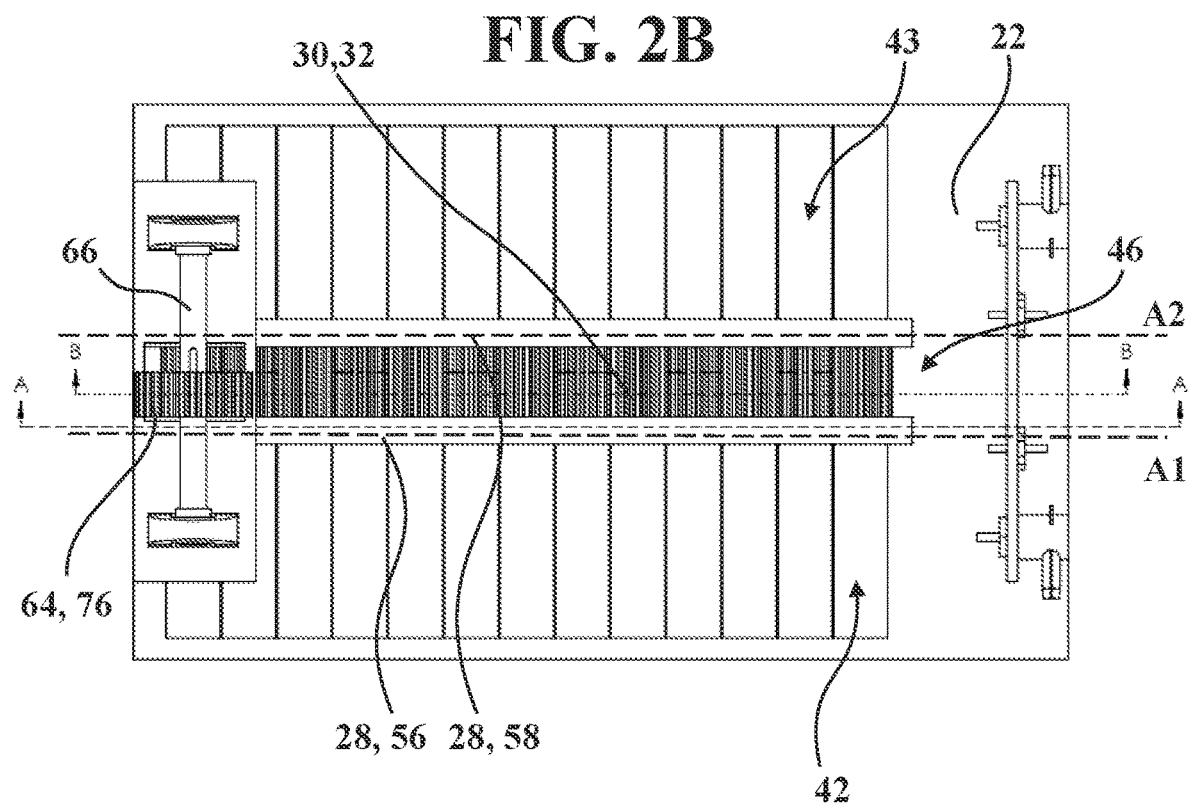
FIG. 2A is a top view of the drive mechanism.

While the invention is susceptible to various modifications and alternative forms, specific embodiments thereof are shown by way of example in the drawings and may herein be described in detail. It should be understood, however, that the drawings and detailed description thereto are not intended to limit the invention to the particular forms disclosed, but on the contrary, the intention is to cover all modifications, equivalents and alternatives falling within the spirit and scope of the present invention as defined by the appended claims.

DETAILED DESCRIPTION OF THE INVENTION

With reference to the Figures, wherein like numerals indicate like parts throughout the several views, an embodiment of a drive mechanism 20 is shown in FIGS. 1-2C, 4, 7, and 10. This drive mechanism 20 includes a mount block 28 extending along an axis A1 and a plurality of electric motors 42 supported by the mount block 28. The electric motors 42 are arranged in series along the axis A1 to define an initial electric motor 47, one or more intermediate electric motors 48, and a final electric motor 49. The drive mechanism 20 also includes a gear 32 mounted to each of the electric motors 42, and an output member 64 driven by the gear 32 mounted to the final electric motor 49 to receive the combined rotational torque from the gears 32 of the series of electric motors 42.

The plurality of electric motors 42 arranged in series permits the rotational torque from the gears 32 to be combined. The combined rotational torque from the gears 32 of the series of electric motors 42 is then transferred from the gear 32 of the final electric motor 49 to drive the output member 64. The series arrangement of the plurality of electric motors 42 lowers the profile of the drive mechanism 20 while still being capable of generating significant power due to the rotational torque from the gears 32 being combined.

In another embodiment, as shown in FIGS. 3, 5A-5B, 8A-8B, and 9, a drive mechanism 20 includes a mount block 28 extending along an axis A1 and a plurality of electric motors 42 supported by the mount block 28. The electric motors 42 are arranged in series along the axis A1 to define an initial electric motor 47, one or more intermediate electric motors 48, and a final electric motor 49. The drive mechanism 20 also includes a sprocket 34 mounted to each of the electric motors 42 and a chain 38 engaged with the sprockets 34. The chain 38 is configured to receive the combined rotational torque from the sprockets 34 mounted to the electric motors 42. The drive mechanism 20 also includes an output member 64 driven by the chain 38 to receive the combined rotational torque from the sprockets 34 mounted to the electric motors 42.

The plurality of electric motors 42 arranged in series permits the rotational torque from the sprockets 34 to be combined. The combined rotational torque from the sprockets 34 of the series of electric motors 42 is then transferred from the sprockets 34 through the chain 38 to drive the output member 64. The series arrangement of the plurality of electric motors 42 lowers the profile of the drive mechanism 20 while still being capable of generating significant power due to the rotational torque from the sprockets 34 being combined.

Figure 6B:
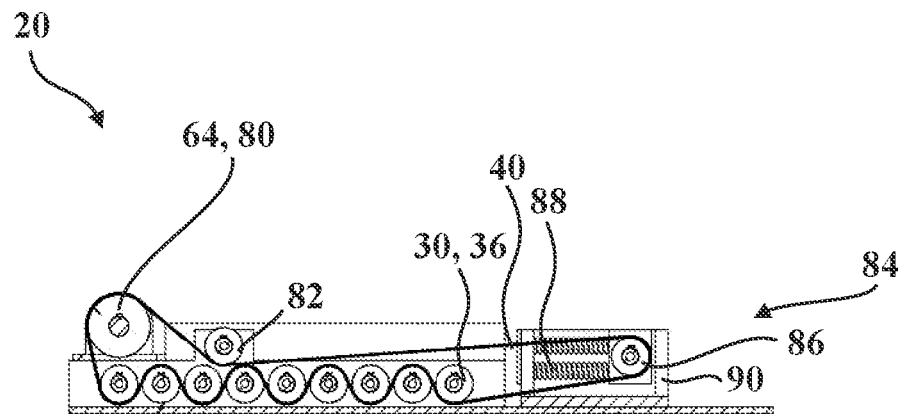
FIG. 6B is a cross-sectional side view of the drive mechanism according to cross-section F-F of FIG. 6A.
Figure 6A:
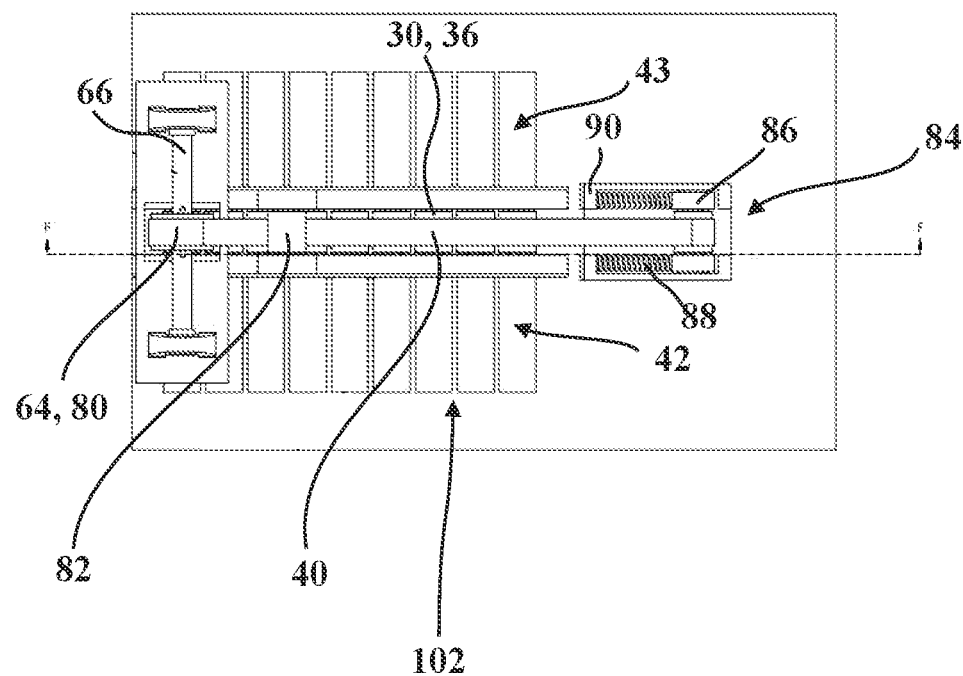
FIG. 6A is a top view of yet another embodiment of the drive mechanism.
Figure 7:
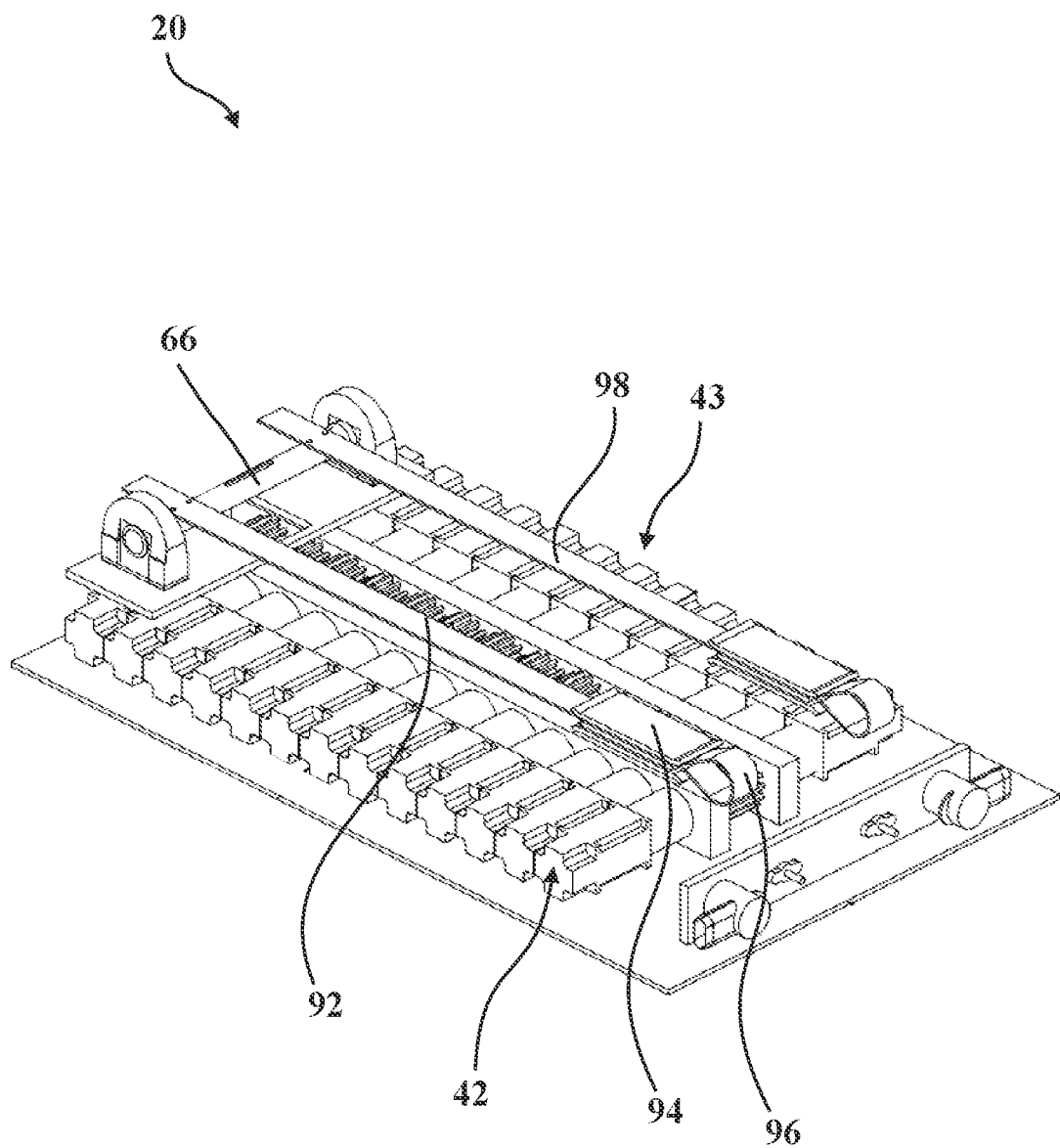
FIG. 7 is a perspective view of the embodiment of the drive mechanism of FIG. 1 including stepper electric motors.
Figure 8B:
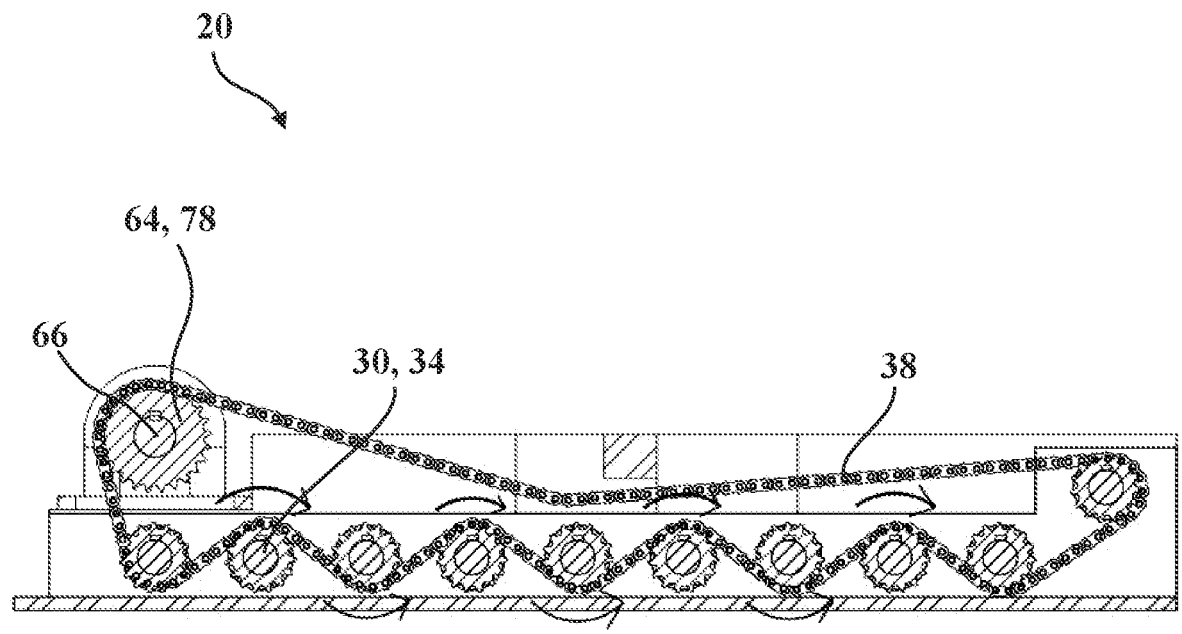
FIG. 8B is a cross-sectional side view of the drive mechanism according to cross-section C-C in FIG. 8A.
Figure 8A:
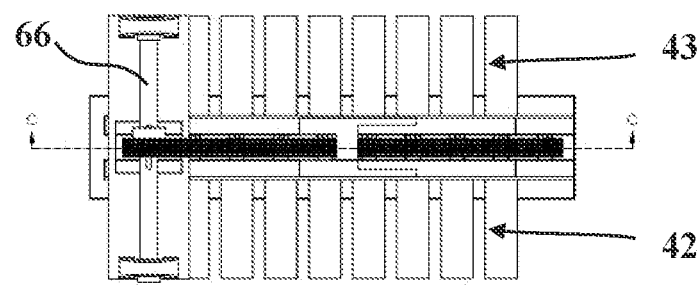
FIG. 8A is a top view of the embodiment of the drive mechanism of FIG. 3.
Figure 9:
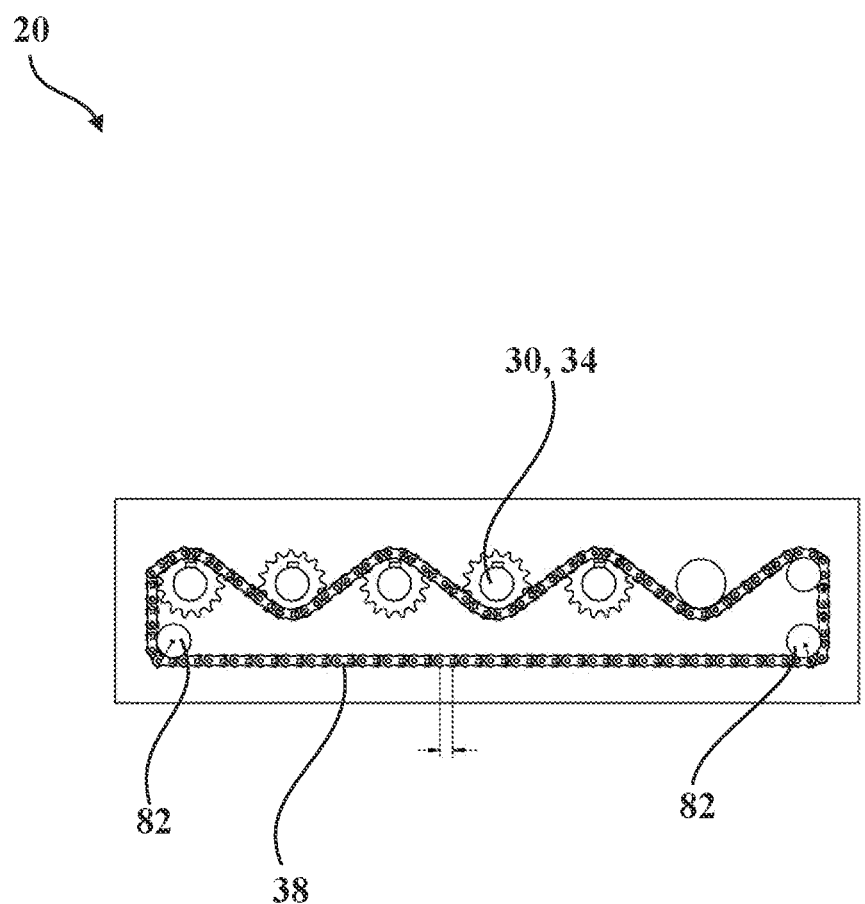
FIG. 9 is a side view of other embodiments of the drive mechanism.

In yet another embodiment, as shown in FIG. 6A-6B, a drive mechanism includes a mount block 28 extending along an axis A1 and a plurality of electric motors 42 supported by the mount block 28. The electric motors 42 are arranged in series along the axis A1 to define an initial electric motor 47, one or more intermediate electric motors 48, and a final electric motor 49. The drive mechanism 20 also includes a pulley 36 mounted to each of the electric motors 42 and a belt 40 engaged with the pulleys 36. The belt 40 is configured to receive the combined rotational torque from the pulleys 36 mounted to the electric motors 42. The drive mechanism 20 also includes an output member 64 driven by the belt 40 to receive the combined rotational torque from the pulleys 36 mounted to the electric motors 42.

The plurality of electric motors 42 arranged in series permits the rotational torque from the pulleys 36 to be combined. The combined rotational torque from the pulleys 36 of the series of electric motors 42 is then transferred from the pulleys 36 through the belt 40 to drive the output member 64. The series arrangement of the plurality of electric motors 42 lowers the profile of the drive mechanism 20 while still being capable of generating significant power due to the rotational torque from the pulleys 36 being combined.

Although not required, the drive mechanism 20 may also include a base support 22 extending along an axis A1 between a first base end 24 and a second base end 26 spaced from the first base end 24. The mount block 28 may be coupled to the base support 22. As described herein, the drive mechanism 20 may also include a gear 32 mounted to each of the electric motors 42. However, more broadly stated, the drive mechanism 20 may include a rotatable driven member 30 mounted to each of the electric motors 42. The plurality of rotatable driven members 30 as described herein may be further defined as a plurality of gears 32, as already mentioned herein, and may particularly be a plurality of pinion gears 32. The plurality of rotatable driven members 30 may also be further defined as a plurality of sprockets 34 or may be further defined as a plurality of pulleys 36. The plurality of rotatable driven members 30 may be spaced from one another substantially along the axis A1 of the mount block 28, as shown in the embodiments of FIGS. 5A-5B, 6A-6B, 8A-8B, and 9.

Although not required, as shown in FIGS. 1, 2A-2C, 4, 7, and 10, the plurality of gears 32 may be in meshed relation with one another. In other words, each of the plurality of gears 32 may be in contact with at least one adjacent gear 32. Moreover, the gear 32 of the final electric motor 49 may be in meshed relation with the output member 64. Alternatively, as shown in FIGS. 3, 5A-5B, 8A-8B, and 9, the drive mechanism 20 may include the chain 38 rotationally coupling the plurality of sprockets 34 to one another. Further still, as shown in FIG. 6A-6B, the drive mechanism 20 may include the belt 40 rotationally coupling the plurality of pulleys 36 to one another. It is to be appreciated that the belt 40 may be further defined as a drive belt 40 or a serpentine belt 40.

The plurality of electric motors 42 may each be stepper electric motors. The plurality of electric motors 42 may each include a housing, a stator disposed within the housing, and a rotor disposed within the stator. Each electric motor 42 may be fixed to the mount block 28. The drive mechanism 20 may further include a plurality of motor shafts 44 rotationally fixed to the rotors of the electric motors 42 and rotationally fixed to one of the plurality of driven members 30. In a non-limiting example, each motor shaft 44 may be keyed, or splined, to one of the plurality of driven members 30 to rotationally fix the motor shaft 44 to the driven member 30. In other non-limiting examples, each motor shaft 44 may be welded, brazed, soldered, or otherwise physically joined with one of the plurality of driven members 30, each motor shaft 44 may be integral with one of the plurality of driven members 30, in a non-limiting example each motor shaft 44 may be formed integrally with one of the plurality of driven members 30 such as but not limited to by casting.

The motor shaft 44 associated with the electric motor 42 may extend through a bore defined by the mount block 28. As such, the mount block 28 may define a plurality of bores through which a plurality of motor shafts 44 may extend. Moreover, the drive mechanism may include a bearing disposed in the bore for supporting rotation of the motor shaft 44. The bearing may be a ball bearing, a roller bearing such as but not limited to a needle bearing, or a plain bearing, among other possibilities. It is to be appreciate that the drive mechanism 20 may include a plurality of bearings, each disposed in one bore defined by the mount block 28.

The plurality of electric motors 42 and the gears 32 may be each rotatable about a rotational axis. The rotational axes of the series of electric motors 42 may be aligned along a common plane. Moreover, the output member 64 may be rotatable about a rotational axis, and the rotational axis of the output member 64 may be offset from the common plane. However, it is to be appreciated that the rotational axis of the output member 64 may be aligned with the common plane.

The mount block 28 may be further defined as a first mount block 56, the plurality of electric motors 42 may be further defined as a first plurality of electric motors 42 defining a first initial electric motor 47, one or more first intermediate electric motors 48, and a first final electric motor 49. The drive mechanism 20 may further include a second mount block 58 extending along a second axis A2. The second axis A2 may extend parallel to the first axis A1. The drive mechanism 20 may also include a second plurality of electric motors 43 supported by the second mount block 58. The second plurality of electric motors 43 are arranged in series along the second axis A2 to define a second initial electric motor 50, one or more second intermediate electric motors 51, and a second final electric motor 53. The second mount block 58 may include all or some of the same characteristics of the first mount block 56, such as defining a plurality of bores and including a plurality of bearings each disposed in one bore of the second mount block 58.

The driven members 30, particularly the gears 32, the first plurality of electric motors 42, and the second plurality of electric motors 43 may be arranged in a plurality of drive assemblies 46. Each drive assembly 46 includes one of the first plurality of electric motors 42, one of the driven members 30 (e.g., one of the gears 32), and one of second plurality of electric motors 43. The drive mechanism 20 may include at least three drive assemblies 46, at least four drive assemblies 46, at least five drive assemblies 46, at least six drive assemblies 46, at least seven drive assemblies 46, at least eight drive assemblies 46, at least nine drive assemblies 46, at least ten drive assemblies 46, or any other larger number of drive assemblies 46.

Moreover, the gear 32 of the first initial electric motor 47 may also be mounted to the second initial electric motor 50. In other words, there may be an initial drive assembly. Additionally, the gear 32 of the first final electric motor 49 may also be mounted to the second final electric motor 53. Thus, there may be a final drive assembly. The gear 32 of each of the one or more first intermediate electric motors 48 may also be mounted to one of the one or more second intermediate electric motors 51. As such, there may be one or more intermediate drive assemblies.

Figure 3:
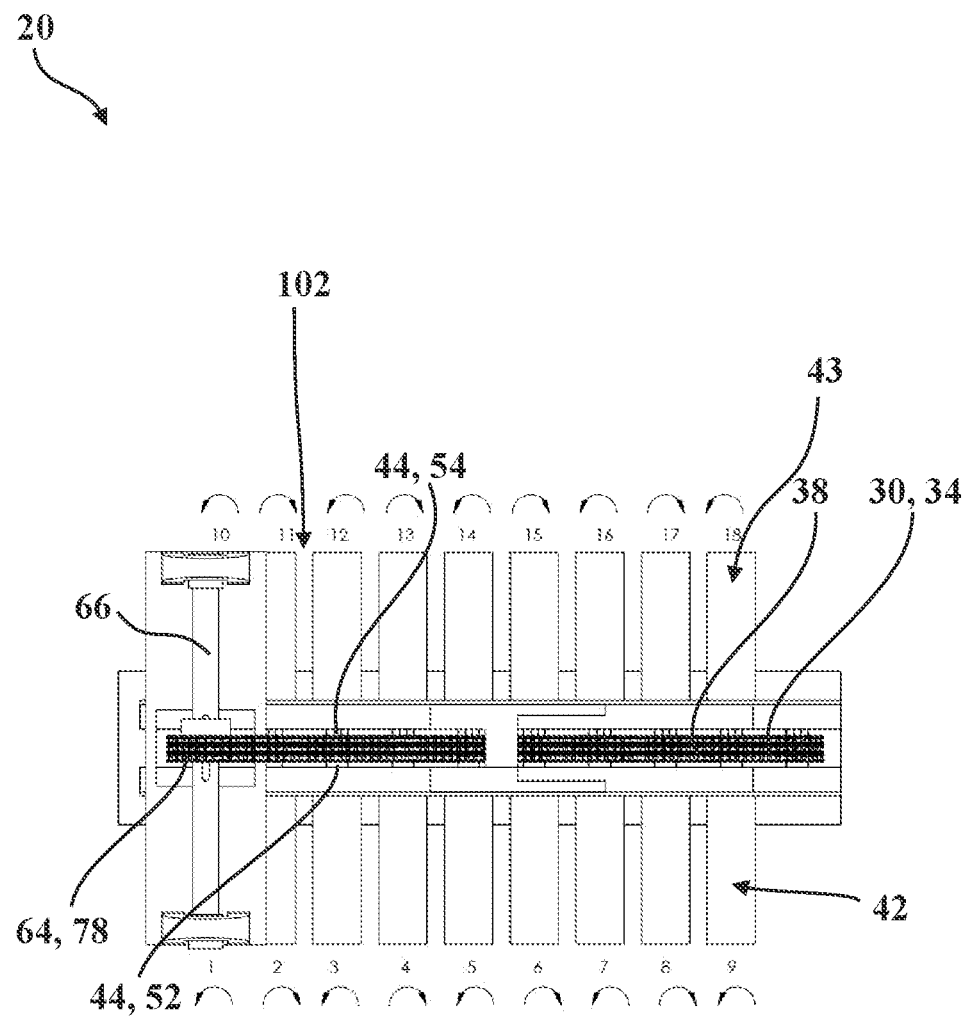
FIG. 3 is a top view of another embodiment of the drive mechanism.
Figure 4:
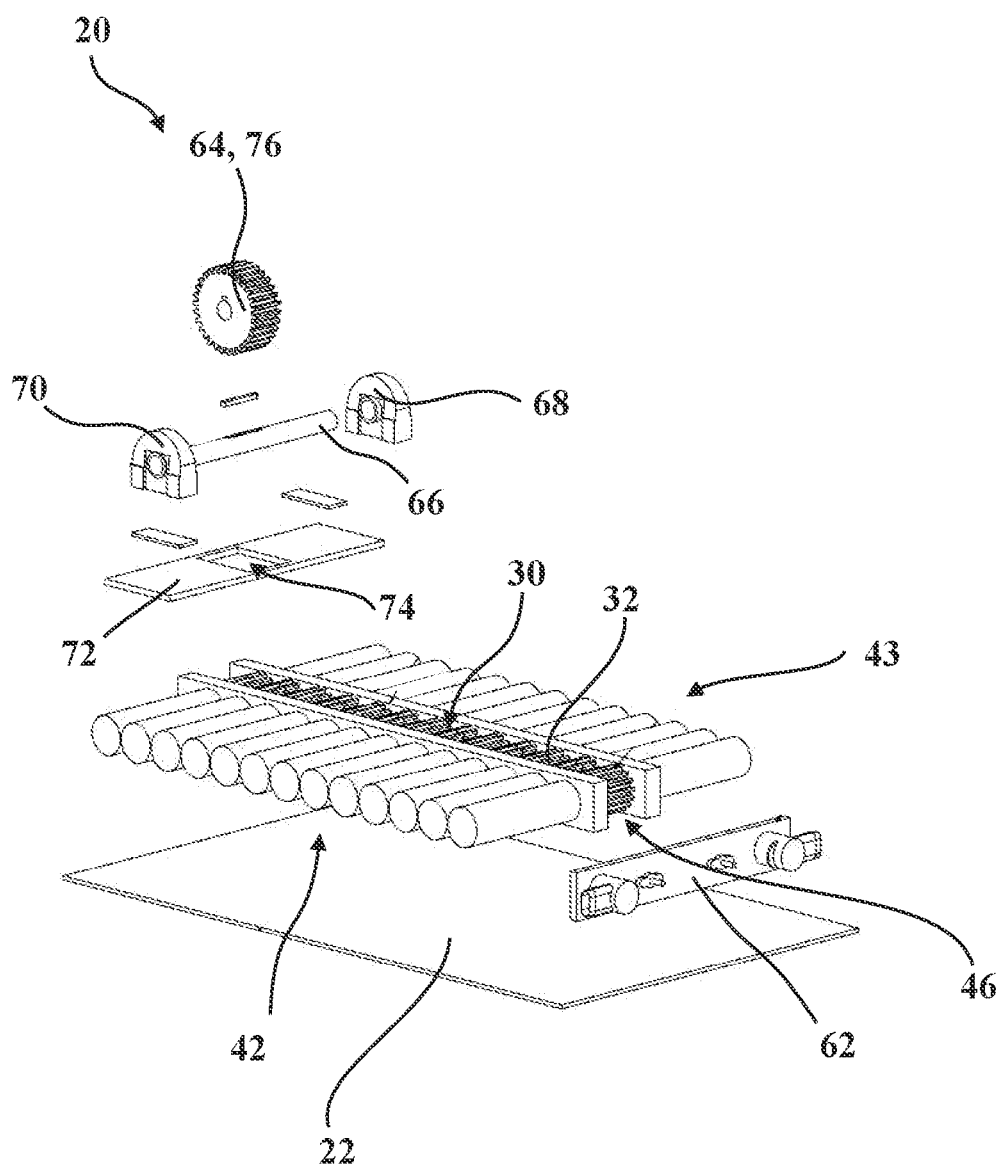
FIG. 4 is an exploded view of the drive mechanism of FIG. 1.
Figure 5B:
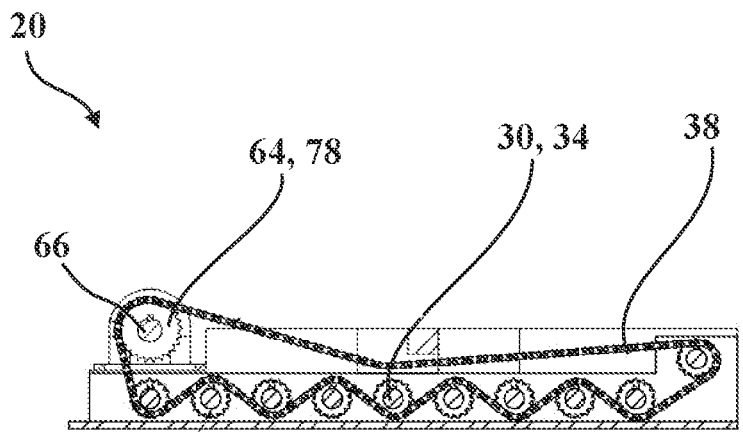
FIG. 5B is a partial cross-sectional side view of the drive mechanism according to cross-section E-E of FIG. 5A.
Figure 5A:
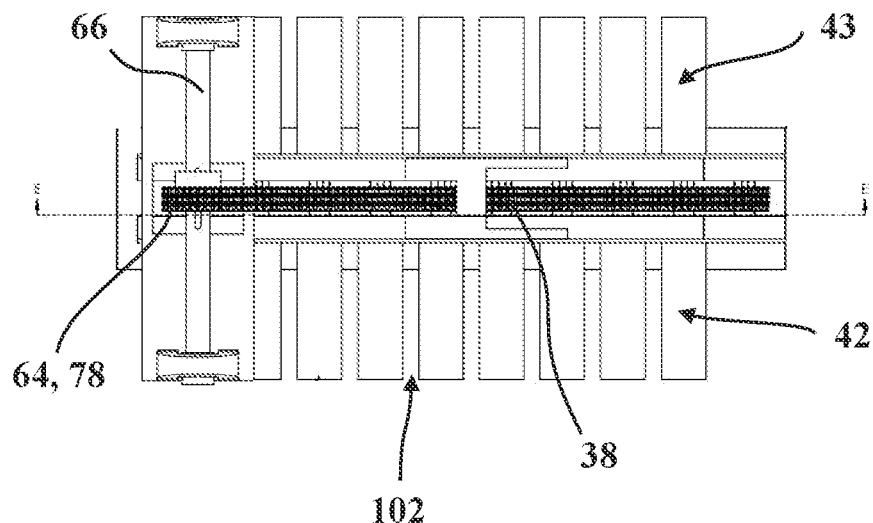
FIG. 5A is a top view of the embodiment of the drive mechanism of FIG. 3.

The first mount block 28 may be disposed between the first plurality of electric motors 42 and the gears 32, and the second mount block 58 may be disposed between the second plurality of electric motors 43 and the gears 32. The first plurality of electric motors 42 and the second plurality of electric motors 43 may be disposed opposite one another and configured to rotate in opposite rotational directions relative to one another when viewed from the axis or side of the motor. In other words, the first plurality of electric motors 42 may be configured to rotate clockwise and the second plurality of electric motors 43 may be configured to rotate counterclockwise, or the first plurality of electric motors 42 may be configured to rotate counterclockwise and the second plurality of electric motors 43 may be configured to rotate clockwise when viewed from the axis or side of the motors. As shown in FIG. 3, when viewed from the top of the drive mechanism, the opposing electric motors will appear to rotate in the same direction. In this manner, the total rotational torque imparted upon the gears 32 is additive of the torque generated by the first plurality of electric motors 42 and the torque generated by the second plurality of electric motors 43. Moreover, in the embodiments where the driven members 30 are sprockets 34 or pulleys 36, adjacent motors 42 along the axis A1 may rotate in opposite rotational directions relative to one another in any of the embodiments.

The one of the first plurality of electric motors 42 and the one of the second plurality of electric motors 43 in one drive assembly 46 may be considered to be in a parallel torque arrangement. Moreover, each drive assembly 46 may be arranged in a series torque arrangement. The electric motors 42 of the drive assemblies 46 arranged in series with one another need not rotate at the same rotational speed. It is contemplated that the electric motors 42 of the drive assemblies 46 arranged in series with one another may rotate at different rotational speeds. Additionally, the first plurality of electric motors 42 and the second plurality of electric motors 43 may be powered by alternating current or direct current. Sources or electrical energy (e.g., wires) to power the first plurality of electric motors 42 and the second plurality of electric motors 43 may be in electrical communication with a power source through electrical connection lugs 60 supported by a back plate 62 coupled to the base support 22.

As mentioned herein, the output member 64 driven by the driven member of the final electric motor 49 receives the combined rotational torque from the driven members of the series of electric motors 42. As such, the output member 64 may be configured to receive rotational torque from the plurality of driven members 30. Although not required, the output member 64 may be sized larger than each individual driven member 30. The output member 64 and the gear 32 of the final electric motor 49 may establish a gear reduction therebetween. For example, in the embodiments where the driven members 30 are pinion gears, the output member 64 may be a spur gear. As such, although not required, the rotational connection between the output member 64 and the gear 32 of the final electric motor 49 may be the only gear reduction in the drive mechanism 20. The rotational torque provided to the output member 64 may be exclusively provided by the gear 32 of the final electric motor 49. Moreover, each of the gears 32 may be sized such that a gear reduction is not established between the gears 32 of the series of electric motors 42.

It is also to be appreciated that in the embodiments with the chain 38, the engagement of the chain 38 with the sprockets 34 may establish the only gear reduction in the drive mechanism 20, and in the embodiments with the belt 40, the engagement of the belt 40 with the pulleys 36 may establish the only gear reduction in the drive mechanism 20. The sprockets 34 may be spaced from one another, and the chain 38 may extend between adjacent sprockets 34 of the series of sprockets 34. Moreover, adjacent electric motors 42 of the series of electric motors 42 may be configured to rotate in opposite rotational directions relative to one another in the embodiments with sprockets 34. Moreover, the pulleys 36 may be spaced from one another, and the belt 40 may extend between adjacent pulleys of the series of pulleys 36. The adjacent electric motors 42 of the series of electric motors 42 may be configured to rotate in opposite rotational directions relative to one another in the embodiments with the pulleys 36.

The drive mechanism 20 may further include an output shaft 66 rotationally fixed to the output member 64 to position the output member 64 for engagement with the gear 32 of the final electric motor 49. The output shaft 66 may be keyed, or splined, to the output member 64 to rotationally fix the output shaft 66 to the output member 64. In other non-limiting examples, the output shaft 66 may be welded, brazed, soldered, or otherwise physically joined with the output member 64, each output shaft 66 may be integral with the output member 64, in a non-limiting example the output shaft 66 may be formed integrally with the output member 64 such as but not limited to by casting.

The drive mechanism 20 may further include a support 72 supported by the first mount block 28 and the second mount block 58. The support 72 defines an opening through which the output member 64 extends to be driven by the gear 32 of the first final electric motor 49 and the second final electric motor 53 to receive the combined rotational torque from the gears 32 of the first plurality of electric motors 42 and the second plurality of electric motors 43. The output shaft 66 may be supported by a first bearing, such as a first pillow block 68, on one end of the output shaft 66 and a second bearing, such as a second pillow block 70, on the other end of the output shaft 66. The first pillow block 68 and the second pillow block 70 may be supported by the support 72.

In the embodiments where the driven members 30 are gears, the output member 64 may be further defined as an output gear 76, and the output gear 76 may extend through the opening 74 defined by the support 72 and into contact with one of the plurality of gears 32. Alternatively, in the embodiments where the driven members 30 are sprockets 34, the output member 64 may be further defined as an output sprocket 78, and the chain 38 may extend through the opening 74 defined by the support 72 to receive rotational torque from the sprockets 34. Further still, in the embodiments where the driven members 30 are pulleys 36, the output member 64 may be further defined as an output pulley 80, and the belt 40 may extend through the opening 74 defined by the support 72 to receive rotational torque from the pulleys 36.

It is also to be appreciated that the drive mechanism 20 may include a tensioner 82 in some embodiments. More specifically, in the embodiments where the driven members 30 are sprockets 34 rotationally coupled to one another through the chain 38, the drive mechanism 20 may include the tensioner 82 to maintain tension on the chain 38. Alternatively, in the embodiments where the driven members 30 are pulleys 36 rotationally coupled to one another through the belt 40, the drive mechanism 20 may include the tensioner 82 to maintain tension on the belt 40, as shown in FIG. 6B. Additionally, the drive mechanism 20 may include a belt tensioner 84 coupled to the belt 40 to tension the belt 40. The belt tensioner 84 may include a tensioner pulley 86 engaged with the belt 40 and a biasing member 88 (e.g., a spring) coupled to the tensioner pulley 86 to bias the tensioner pulley 86 against the belt 40 such that the belt 40 is tensioned. The belt tensioner 84 may also include a belt tensioner housing 90 to contain the tensioner pulley 86 and the biasing member 88 within the belt tensioner housing 90.

Figure 10:
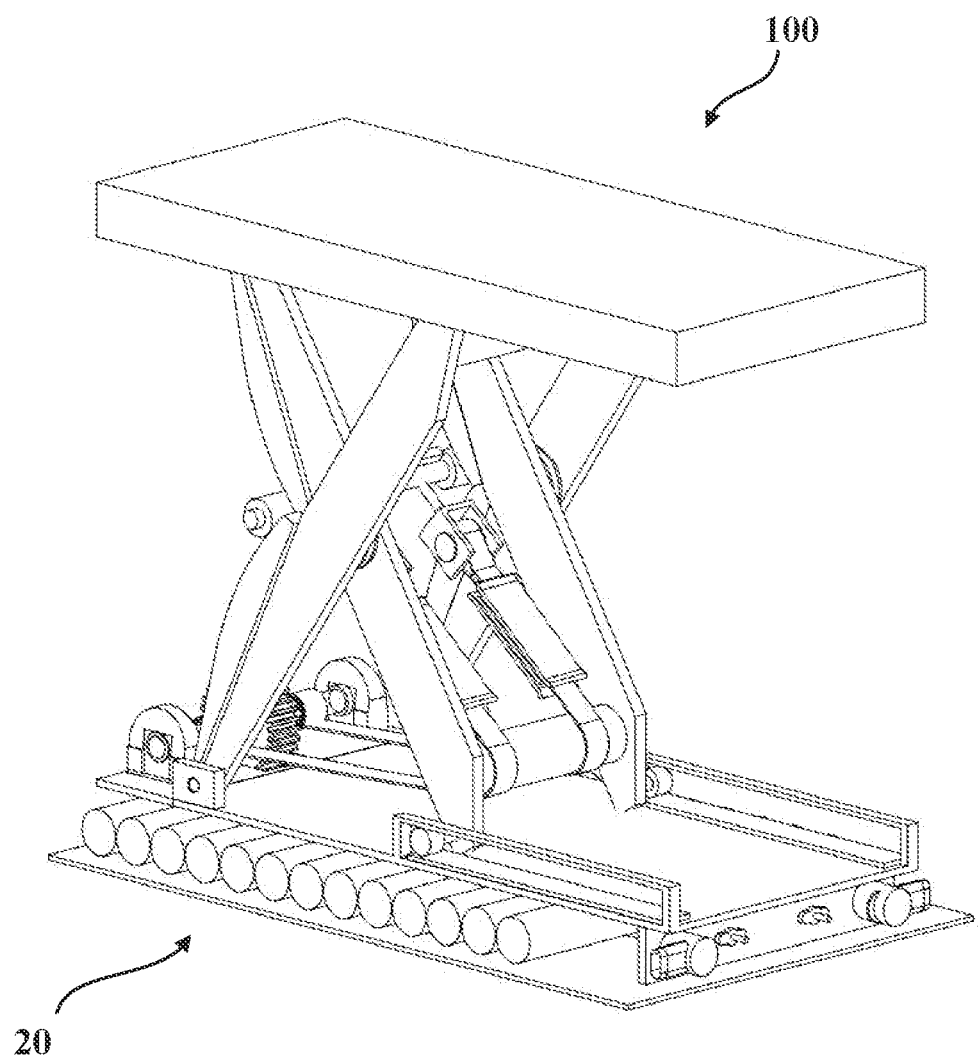
FIG. 10 is a perspective view of the drive mechanism of FIG. 1 integrated into a lift assembly.

The drive mechanism 20 may further include an output belt 92 fixed to the output shaft 66 and configured to be wound about the output shaft 66 upon rotation of the driven members 30 (e.g., the gears 32). Upon rotation of the output shaft 66, the output belt 92 may be wound about the output shaft 66. The output belt 92 may include a clamp 94 to create a loop 96 at an end of the output belt 92. It is also to be appreciated that the drive mechanism 20 may include a second output belt 98 having the characteristics of the output belt 92 as described herein, or may include a third output belt or more output belts. Although not required, the output belt(s) may integrated into a transportation system such as a lift assembly 100, as shown in FIG. 10, for moving items or people between two vertically different locations. In a non-limiting example, the lift assembly 100 is a scissor lift. Moreover, the drive mechanism 20 may include a plurality of wheels such that the drive mechanism 20 is portable.

The drive mechanism 20 may include a control system to synchronize the electric motors 42. More specifically, the control system may synchronize the relative rotational speeds (e.g. RPM) of the one of the first plurality of electric motors 42 and the one of the second plurality of electric motors 43 within the same drive assembly 46. Moreover, the control system may synchronize the relative rotational speeds (e.g. RPM) between various drive assemblies 46 in the drive mechanism 20. As discussed above, the electric motors 42 of the drive assemblies 46 arranged in series with one another need not rotate at the same rotational speed. It is contemplated that the electric motors 42 of the drive assemblies 46 arranged in series with one another may rotate at different rotational speeds. Therefore, the control system is configured to synchronize the electric motors 42 of the various drive assemblies 46 without binding the driven members 30 (e.g., the gears 32).

Additionally, the control system may be used as a brake to lock the electric motors 42 and prevent rotation of the driven members 30. More specifically, the control system may be configured as an electronic break capable of rotationally locking the first plurality of electric motors 42 and the second plurality of electric motors 43 to prevent rotation of the gears 32. This control system, however, adds complexity and cost to the drive assembly 46. As such, it is contemplated that, in the embodiments where the driven members 30 are gears 32, the contact between adjacent gears 32 creates friction and back-drive between the gears 32 and/or the electric motors 42. As such, in the embodiments where the driven members 30 are gears 32, no control system need be used a brake, thus simplifying the control system (e.g., brake synchronization among electric motors 42) and lowering the cost of the drive assembly 46. However, the control system to be used a brake may be included nonetheless as a redundant safety precaution.

The drive mechanism 20 may be configured to produce high torque at low rotations per minute (RPM) of the output shaft 66 and/or the driven members 30. For example, when integrated into the lift assembly, the drive mechanism 20 may exert sufficient torque to lift thousands of pounds. As non-limiting examples, the first plurality of electric motors 42, the second plurality of electric motors 43, and the gears 32 may be together configured to rotate the output shaft 66 between 1 RPM and 50 RPM, between 5 RPM and 40 RPM, between 10 RPM and 30 RPM, between 10 RPM and 20 RPM, and may be approximately 15 RPM. Such low rotations per minute of the output shaft 66 prevents binding of the driven members 30, which may otherwise be expected from such an arrangement.

Moreover, the electric motors 42 arranged in spaced relation to one another along the axis A1 do not present any electric and magnetic field concerns that would prevent the electric motors 42 from successful operation. More specifically, because the relative energy usage of each electric motor 42 is relatively low, the total flux generated by the electric motor 42 is insufficient is cause malfunction of adjacent electric motor(s) 42. Therefore, the electric motors 42 may be arranged in spaced relation to one another relatively closely along the axis A1. For example, a gap may be defined between adjacent electric motors 42 along the axis A1. The gap 102 may be between 0.1 inches and 3 inches, may be between 0.25 inches and 2 inches, may be between 0.25 inches and 1.5 inches, may be between 0.25 inches and 1.25 inches, and may be between 0.25 inches and 1 inch.

The drive mechanism 20 is designed to be low to the ground, and as such, may be referred to as a low-profile drive mechanism 20. As measured from the base support 22 to the output member 64, in non-limiting examples, the height of the drive mechanism 20 between the base support 22 and the output member 64 may be between about 5 inches and about 14 inches, may be between about 7 inches and about 12 inches, may be between about 8 inches and about 12 inches, may be between about 9 inches and about 11 inches, and may be about 10 inches. In a non-limiting example, a prototype manufactured was limited in height to about 10.3 inches. Depending upon end use, minimizing the height of the drive mechanism 20 may advantageously permit the drive mechanism 20 to operate in confined spaces, potentially generating a meaningful impact on performance of the drive mechanism 20.

Figure 11:
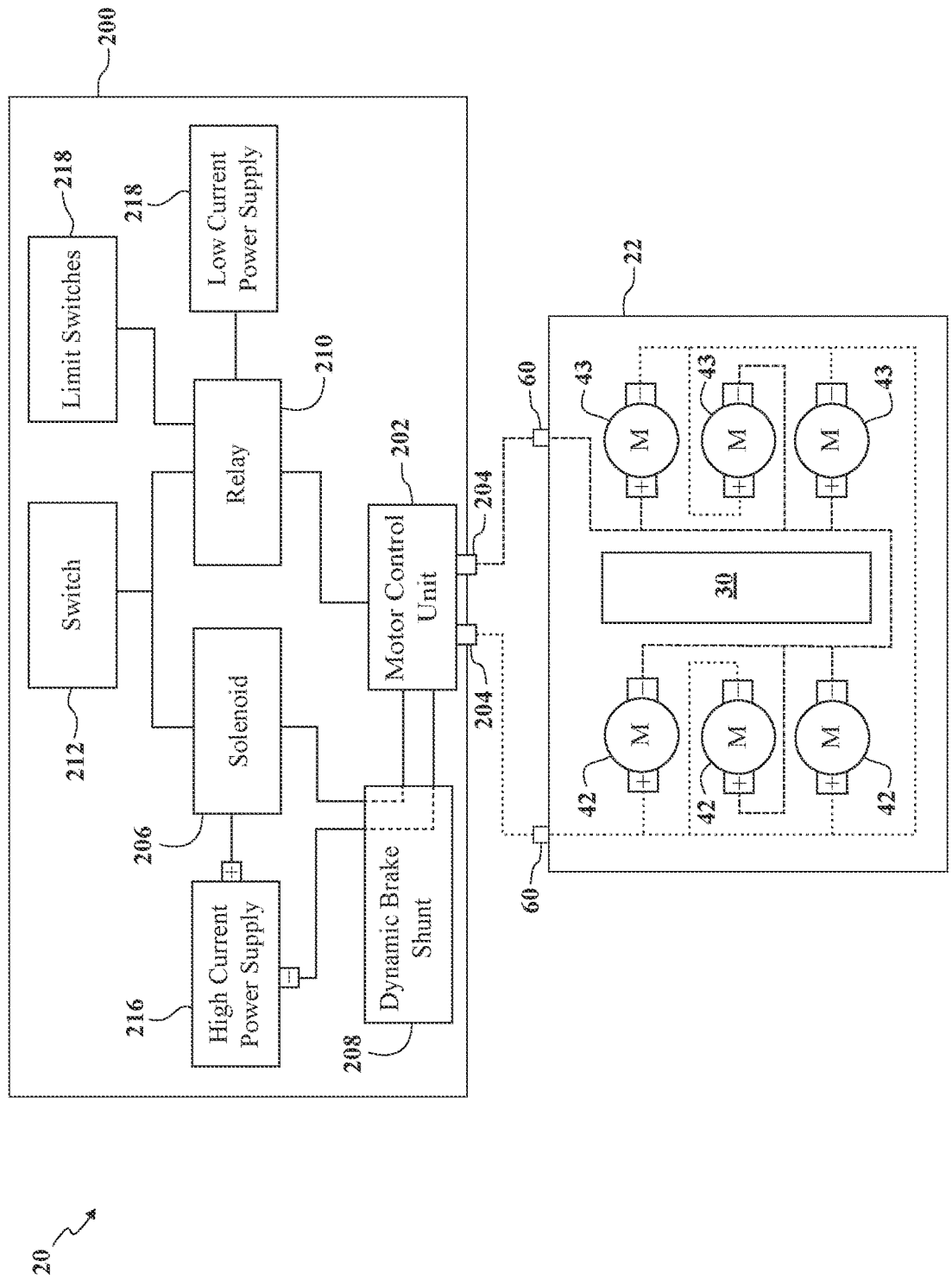
FIG. 11 is a schematic view of a control system of the drive mechanism.

As shown in FIG. 11, the drive mechanism 20 may also include a control system 200 electrically coupled to the plurality of electric motors 42, or more particularly the first plurality of electric motors 42 and/or to the second plurality of electrical motors 43, such as via the lugs 60 coupled to the base support 22. The control system 200 may be configured to generate and supply a drive signal to each of the first plurality of electric motors 42 and/or the second plurality of electrical motors 43 to rotate the same as described herein.

More specifically, the first plurality of electric motors 42 and/or the second plurality of electrical motors 43 may be arranged within the drive mechanism 20 such that the drive signal generated by the control system 200 is applied to each of the first plurality of electric motors 42 and/or each of the second plurality of electrical motors 43 in parallel. Each pair of adjacent motors of the first plurality of electric motors 42 and/or of the second plurality of electric motors 43 may be wired in opposite orientations relative to the path of the drive signal so as to rotate in different directions responsive to the drive signal. Similarly, assuming the driven members 30, the first plurality of electric motors 42, and the second plurality of electric motors 43 are arranged to form a plurality of drive assemblies 46 as described above, the one of first plurality of electric motors 42 and the one of the second plurality of electric motors 43 of each drive assembly 46 may be wired in opposite orientations so as to rotate in different directions.

The control system 200 may include a motor control unit 202 configured to generate and supply the drive signal to the first plurality of electric motors 42 and/or the second plurality of electric motors 43 over a pair of terminals 204, which may each be releasably connected to a different one of the lugs 60. One of the terminals 204 may be defined as a high-side terminal for the path of the drive signal, and another one of the terminals 204 may be defined as a low-side terminal for the path of the drive signal. Each of the first plurality of motors 42 and/or each of the second plurality of motors 43 may likewise be directly connected to both of the lugs 60 in an alternating matter. For instance, assuming each motor 42, 43 includes first and second terminals each connected to a different one of the lugs 60, the first terminal of each given motor 42, 43 may be connected to a different one of the lugs 60 than the first terminal of each motor 42, 43 adjacent the given motor 42, 43. Similarly, the second terminal of each given motor 42, 43 may be connected to a different one of the lugs 60 than the second terminal of each motor 42, 43 adjacent the given motor 42, 43. As a result of this arrangement, responsive to receiving the drive signal form the motor control unit 202, the motors 42, 43 may rotate in opposite directions as described above.

The control system 200 may also include a solenoid 206 electrically coupled to the motor control unit 202, such as through a dynamic brake shunt 208, and may include a relay 210 electrically coupled to the motor control unit 202. The solenoid 206 and the relay 210 may be electrically coupled to a switch 212 of the control system 200. During operation, a user may interact with the switch 212 to input an instruction to activate the drive assembly 20 to initiate the motors 42, 43 and thereby move a load via the output member 64. For instance, the switch 212 may be realized as a pendant with one user-interactive element for causing the drive mechanism 20 to move a load in a first direction, and another user-interactive element for causing the drive mechanism 20 to move the load in a second direction opposite the first direction.

User interaction with the switch 212 may set the relay 210 to a corresponding position, including a position corresponding to the direction of movement indicated by the user interaction, which in turn may cause the relay 210 to output a corresponding control signal to the motor control unit 202. To this end, the relay 210 may also be connected to a low current power supply 218. User interaction with the switch 212 may also trigger the solenoid 206 to connect a high current power supply 212 to the motor control unit 202 for generation of the drive signal described above. Responsive to receiving both a power signal from the high current power supply 216 and the control signal via the relay 210 indicating a desired movement, the motor control unit 212 may be configured to generate and supply a drive signal to each of the motors 42, 43 to facilitate the desired movement as described herein.

In some implementations, the motor control unit 202 may include a pulse width modulation (PWM) signal generator and an H-bridge driven by the PWM signal generator to generate the drive signal applied to each of the motors 42, 43. It has been stated by those of skill in the art that generating a combined motor torque of sufficient magnitude for lifting a significant load (e.g., one thousand pounds or more) would require individualized control of each motor, which would be problematic in a small form factor due to both the mechanical strain and electromagnetic interference between motors. However, the above configuration of the motor control unit 202 has been able to drive the motors 42, 43 when arranged as described herein without processing feedback from the motors 42, 43 or other sensors, such as to synchronize the relative rotational speeds of the motors 42, 43 via distinct drive signals provided to each motor 42, 43. For instance, by realizing the driving members 30 as a series of gears 32 meshed in relation to one another, with the motors 42, 43 driving the gears 32 being spaced and rotating in different directions as described herein, the variation between the operation of the motors 42, 23 is naturally compensated by the play therebetween without the need for any feedback, and while providing a low-profile device that offers a generous amount of torque via the output member 64. Moreover, the contact between each pair of adjacent ones of said gears 32 in the above arrangement can create a friction that prevents movement of said gears when the output member is supporting a significantly load, such as a load greater than or equal to one thousand pounds, absent torque being applied to the gears by said first and second plurality of electric motors 42, 43. Consequently, an electronic or other braking technology may be omitted from the drive mechanism 20.

The control system 200 may further include one or more limit switches 220 for limiting movement of the drive assembly 20 in any direction by a set distance. For instance, each limit switch 220 may be configured to monitor a traveled distance or position of the drive assembly 20 in a given direction, and to automatically stop operation of the motors 42, 43 upon the limit switch 220 being triggered, indicative that the load should not be moved any further in the given direction. To this end, the limit switches 220 may be coupled to the relay 210, and may be configured upon being triggered to set the relay 210 to a position that stops generation of the drive signal by the motor control unit 202. Responsive to application of the drive signal to the motors 42, 43 ceasing, which may also be selectively caused by the user via the switch 212, the dynamic brake shunt 208 may be configured to assist in bringing the driving mechanism 20 to rest, such as by connecting the terminals of each motor 42, 43 across one or more resistors.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A drive mechanism comprising:
    a mount block extending along an axis;
    a plurality of electric motors supported by said mount block, with said electric motors arranged in series along said axis to define an initial electric motor, one or more intermediate electric motors, and a final electric motor;
    a gear mounted to each of said electric motors; and
    an output gear driven by said gear mounted to said final electric motor to receive the combined rotational torque from said gears of said series of electric motors,
    wherein said rotational torque provided to said output gear is exclusively provided by said gear of said final electric motor.

2. The drive mechanism of claim 1, wherein said output gear and said gear of said final electric motor establish a gear reduction therebetween.

3. The drive mechanism of claim 1, wherein each of said gears is sized such that a gear reduction is not established between said gears of said series of electric motors.

4. The drive mechanism of claim 1, wherein said plurality of electric motors and said gears are each rotatable about a rotational axis, with said rotational axes of said series of electric motors being aligned along a common plane, and wherein said output gear is rotatable about a rotational axis, and wherein said rotational axis of said output gear is offset from said common plane.

5. The drive mechanism of claim 1 further comprising an output shaft rotationally fixed to said output gear to position said output gear for engagement with said gear of said final electric motor, and further comprising an output belt fixed to said output shaft and configured to be wound about said output shaft upon rotation of said gears.

6. The drive mechanism of claim 1, wherein said gears are in meshed relation with one another.

7. The drive mechanism of claim 1, wherein said gear of said final electric motor is in meshed relation with said output gear.

8. The drive mechanism of claim 1 further comprising a base support extending along said axis, wherein said mount block is supported by said base support, and wherein a height between said base support and said output gear is between 5 inches and 14 inches.

9. The drive mechanism of claim 1, wherein said mount block is further defined as a first mount block, and said plurality of electric motors is further defined as a first plurality of electric motors defining a first initial electric motor, one or more first intermediate electric motors, and a first final electric motor, and further comprising:
    a second mount block extending along a second axis; and
    a second plurality of electric motors supported by said second mount block, with said second plurality of electric motors arranged in series along said second axis to define a second initial electric motor, one or more second intermediate electric motors, and a second final electric motor.

10. A drive mechanism comprising:
    a first mount block extending along an axis;
    a first plurality of electric motors supported by said first mount block, with said first plurality of electric motors arranged in series along said axis to define a first initial electric motor, one or more first intermediate electric motors, and a first final electric motor;
    a second mount block extending along a second axis;
    a second plurality of electric motors supported by said second mount block, with said second plurality of electric motors arranged in series along said second axis to define a second initial electric motor, one or more second intermediate electric motors, and a second final electric motor;

a gear mounted to each of said first electric motors; and
an output gear driven by said gear mounted to said first final electric motor to receive the combined rotational torque from said gears of said series of electric motors.

11. The drive mechanism of claim 10, wherein said gears, said first plurality of electric motors, and said second plurality of electric motors are arranged in a plurality of drive assemblies, each drive assembly including one of said first plurality of electric motors, one of said gears, and one of said second plurality of electric motors.

12. The drive mechanism of claim 11, wherein said plurality of drive assemblies is further defined as at least five drive assemblies.

13. The drive mechanism of claim 10, wherein said gear of said first initial electric motor is also mounted to said second initial electric motor, and wherein said gear of said first final electric motor is also mounted to said second final electric motor.

14. The drive mechanism of claim 10, wherein said first mount block is disposed between said first plurality of electric motors and said gears, and wherein said second mount block is disposed between said second plurality of electric motors and said gears.

15. The drive mechanism of claim 10, wherein said first plurality of electric motors and said second plurality of electric motors are disposed opposite one another and configured to rotate in opposite rotational directions relative to one another.

16. The drive mechanism of claim 10, further comprising a support supported by said first mount block and said second mount block, wherein said support defines an opening through which said output gear extends to be driven by said gear of said first final electric motor and said second final electric motor to receive the combined rotational torque from said gears of said first plurality of electric motors and second plurality of electric motors.

17. The drive mechanism of claim 10, wherein said first plurality of electric motors, said second plurality of electric motors, and said gears are together configured to rotate said output shaft between 1 rotation per minute and 50 rotations per minute.

18. The drive mechanism of claim 10, wherein said gears, said first plurality of electric motors, and said second plurality of electric motors are arranged in a plurality of drive assemblies, each drive assembly including one of said first plurality of electric motors, one of said gears, and one of said second plurality of electric motors, and further comprising a control system configured to generate and supply a drive signal to each of said first and second plurality of electric motors in parallel to rotate each of said first and second plurality of electric motors.

19. The drive mechanism of claim 18, wherein said first plurality of electric motors and said second plurality of electric motors are disposed opposite one another and configured to rotate in opposite rotational directions relative to one another when viewed along said axis of said motors, and adjacent electric motors of each of said first and second plurality of electrical electric motors are configured to rotate in opposite rotational directions relative to one another when viewed along said axis of said motors.

20. The drive mechanism of claim 19, wherein said control system comprises a pulse width modulation (PWM) signal generator and an H-Bridge driven by said PWM signal generator to generate the drive signal applied to each of said first and second plurality of electric motors.

21. The drive mechanism of claim 20, wherein said gears are in meshed relation with one another with contact between each pair of adjacent ones of said gears creating a friction that prevents movement of said gears when said output gear is supporting a load greater than or equal to one thousand pounds absent torque being applied to said gears by said first and second plurality of electric motors.

22. A drive mechanism comprising:
a mount block extending along an axis;
a plurality of electric motors supported by said mount block, with said electric motors arranged in series along said axis to define an initial electric motor, one or more intermediate electric motors, and a final electric motor;
a gear mounted to each of said electric motors; and
an output gear driven by said gear mounted to said final electric motor to receive the combined rotational torque from said gears of said series of electric motors,
wherein said plurality of electric motors and said gears are each rotatable about a rotational axis, with said rotational axes of said series of electric motors being aligned along a common plane, and
wherein said output gear is rotatable about a rotational axis, and wherein said rotational axis of said output gear is offset from said common plane.

23. The drive mechanism of claim 22, wherein each of said gears is sized such that a gear reduction is not established between said gears of said series of electric motors.

24. The drive mechanism of claim 22, wherein said gears are in meshed relation with one another.

25. The drive mechanism of claim 22, wherein said gear of said final electric motor is in meshed relation with said output gear.

26. A drive mechanism comprising:
a mount block extending along an axis;
a plurality of electric motors supported by said mount block, with said electric motors arranged in series along said axis to define an initial electric motor, one or more intermediate electric motors, and a final electric motor;
a gear mounted to each of said electric motors;
an output gear driven by said gear mounted to said final electric motor to receive the combined rotational torque from said gears of said series of electric motors;
an output shaft rotationally fixed to said output gear to position said output gear for engagement with said gear of said final electric motor; and
an output belt fixed to said output shaft and configured to be wound about said output shaft upon rotation of said gears.

27. The drive mechanism of claim 26, wherein said plurality of electric motors and said gears are each rotatable about a rotational axis, with said rotational axes of said series of electric motors being aligned along a common plane, and wherein said output gear is rotatable about a rotational axis, and wherein said rotational axis of said output gear is offset from said common plane.

28. The drive mechanism of claim 26, wherein said mount block is further defined as a first mount block, and said plurality of electric motors is further defined as a first plurality of electric motors defining a first initial electric motor, one or more first intermediate electric motors, and a first final electric motor, and further comprising:
a second mount block extending along a second axis; and
a second plurality of electric motors supported by said second mount block, with said second plurality of electric motors arranged in series along said second axis to define a second initial electric motor, one or more second intermediate electric motors, and a second final electric motor.

29. The drive mechanism of claim 26, wherein said gears are in meshed relation with one another.

30. The drive mechanism of claim 26, wherein said gear of said final electric motor is in meshed relation with said output gear.

* * * * *